United States Patent [19]
Lashmore et al.

[11] Patent Number: 6,129,790
[45] Date of Patent: *Oct. 10, 2000

[54] LOW CORE LOSS, WELL-BONDED SOFT MAGNETIC

[75] Inventors: David S. Lashmore, Lebanon; Glenn L. Beane, Hanover; Lev Deresh, Plainfield; Zonglu Hua, Lebanon, all of N.H.

[73] Assignee: Materials Innovation, Inc., West Lebanon, N.H.

[ * ] Notice: This patent is subject to a terminal disclaimer.

[21] Appl. No.: 09/249,342

[22] Filed: Feb. 11, 1999

Related U.S. Application Data

[62] Division of application No. 09/183,080, Oct. 30, 1998, which is a division of application No. 09/010,073, Jan. 21, 1998, Pat. No. 5,982,073.
[60] Provisional application No. 60/069,832, Dec. 16, 1997.
[51] Int. Cl.$^7$ ....................................... H01R 1/24
[52] U.S. Cl. .......................... 148/307; 148/308; 148/309; 148/310; 148/104; 148/311
[58] Field of Search .................................. 148/307, 308, 148/309, 310, 311, 104

[56] References Cited

U.S. PATENT DOCUMENTS

| | | |
|---|---|---|
| Re. 32,654 | 4/1988 | Jackson, Jr. . |
| 1,850,181 | 3/1932 | Roseby . |
| 2,162,273 | 6/1939 | Schulze . |
| 2,783,208 | 2/1957 | Katz . |
| 3,245,841 | 4/1966 | Clarke et al. . |
| 4,090,868 | 5/1978 | Tengzelius et al. . |
| 4,093,449 | 6/1978 | Svensson et al. . |
| 4,126,452 | 11/1978 | Tengzelius et al. . |
| 4,404,503 | 9/1983 | Ward et al. . |
| 4,601,765 | 7/1986 | Soileau et al. . |
| 4,602,957 | 7/1986 | Pollock et al. . |
| 4,933,004 | 6/1990 | Hoppe et al. . |
| 4,947,065 | 8/1990 | Ward et al. . |
| 5,021,085 | 6/1991 | Karagoz et al. . |
| 5,063,011 | 11/1991 | Rutz et al. . |
| 5,097,168 | 3/1992 | Takekoshi et al. . |
| 5,198,137 | 3/1993 | Rutz et al. . |
| 5,211,896 | 5/1993 | Ward et al. . |
| 5,237,232 | 8/1993 | Kitamura . |
| 5,268,140 | 12/1993 | Rutz et al. . |
| 5,341,076 | 8/1994 | Bahn . |
| 5,498,918 | 3/1996 | Weihrauch . |
| 5,563,001 | 10/1996 | Gay . |
| 5,629,092 | 5/1997 | Gay et al. . |

FOREIGN PATENT DOCUMENTS 810615  12/1997  European Pat. Off. .

OTHER PUBLICATIONS

Bozorth, Richard, *Ferromagnetism* (1951) D. Van Norstrand Company, New York; pp. 78–88, 205, 389, 571.

Lorin, Guy, *Phosphating of Metals* (1974) Finishing Publications, Ltd., Middlesex, Great Britain; pp. 4, 7–76.

Freeman, D.B., *Phosphating and metal pre–treatment* (1986) Industrial Press, Inc., New York; pp. 9–42.

Rausch, Werner, *The Phosphating of Metals* (1990) Finishing Publications, Ltd., Great Britain; pp. 47–136.

*Primary Examiner*—C. Melissa Koslow
*Attorney, Agent, or Firm*—Fran S. Wasserman

[57] ABSTRACT

A ferromagnetic powder comprising ferromagnetic particles coated with a material that does not degrade at temperatures above 150° C. and permits adjacent particles to strongly bind together after compaction such that parts made from the ferromagnetic powder have a transverse rupture strength of about 8,000 to about 20,000 pounds/square inch before sintering. The coating includes from 2 to 4 parts of an oxide and one part of a chromate, molybdate, oxalate, phosphate, or tungstate. The coating may be substantially free of organic materials. The invention also includes a method of making the ferromagnetic powder, a method of making soft magnetic parts from the ferromagnetic powder, and soft magnetic parts made from the ferromagnetic powder.

2 Claims, 8 Drawing Sheets

LOW CORE LOSS, WELL-BONDED SOFT MAGNETIC

This is a divisional of U.S. patent application Ser. No. 09/183,080 filed Oct. 30, 1998; which in turn is a divisional of U.S. patent application Ser. No. 09/010,073 filed Jan. 21, 1998, now U.S. Pat. No. 5,982,073 which claims priority from Provisional Application No. 60/069,832, filed Dec. 16, 1997.

FIELD OF THE INVENTION

This invention relates to ferromagnetic powder intended for use in the manufacture of both soft and hard (permanent) magnetic parts. The invention further relates to a method of making such ferromagnetic powder, methods of making parts from the ferromagnetic powder and to parts, including stators, rotors, armatures and actuators made from the ferromagnetic powder.

BACKGROUND OF THE INVENTION

Magnetic materials generally fall into two classes, magnetically hard substances which may be permanently magnetized, and soft magnetic materials whose magnetization may be reversed at relatively low applied fields. Permeability and coercive filed values are a measurements of the ease with which a magnetic substance can be magnetized or carry a magnetic flux. Permeability is indicated by the ratio of B/H. The coercive force, $H_c$, is the magnetic force or field intensity necessary to change magnetic induction B from − to +. It is important in soft magnetic materials that energy loss, normally "core loss" is kept to a minimum whereas in hard magnetic materials it is preferred to resist changes in magnetization. High core losses are therefore characteristic of permanent magnetic materials and are undesirable in soft magnetic materials.

Soft magnetic core components are frequently used in electrical/magnetic conversion devices such as motors, generators and transformers and alternators, particularly those found in automobile engines. The most important characteristics of ferromagnetic soft magnetic core components are their maximum induction, magnetic permeability, and core loss characteristics. When a magnetic material is exposed to a rapidly varying magnetic field, a resultant energy loss in the core material occurs. These core losses are commonly divided into two principle contributing phenomena: hysteresis and eddy current losses. Hysteresis loss results from the expenditure of energy to overcome the retained magnetic forces within the iron core component. Eddy current losses are brought about by the production of induced currents in the iron core component due to the changing flux caused by alternating current (AC) conditions.

Conventional practice has been to fabricate soft magnetic materials and parts by forming laminated structures of thin die stamped ferrous sheets, typically a silicon-iron alloy. The sheets are oriented parallel to the magnetic field to assure low reluctance. The laminations must be stacked in correct alignment and the stack of laminations must then be secured together, for example, by welding, riveting, gluing, etc. The sheets may be varnished phosphated or otherwise coated to provide for some insulation between them. This insulation is intended to prevent current from circulating between sheets and therefore to keep eddy current losses low. In die stamping, there is however, a certain amount of scrap loss and hence unnecessary expense. In addition, the stamping process sometimes results in burrs requiring a subsequent deburring step and a thick bed coating to keep the sharp edges from cutting the insulation on the electrical conductors. Moreover, the stacked cores are known to suffer from large core losses at higher frequencies and are acoustically noisy (hysteresis) since the laminations tend to vibrate. This vibration also contributes to energy loss. U.S. Pat. No. 3,670,407 to Mewhinney et al. describes a stator made by such a stacked lamination and an attempt to reduce the eddy currents therein.

Another significant drawback to making soft magnetic parts from steel laminate structures is that it is difficult and time consuming to make parts having a three-dimensional configuration for moving flux out of the plane of the lamination. Certain three-dimensional configurations are very difficult and expensive to achieve with steel laminate structures.

The use of powdered metals avoids the manufacturing burden inherent in laminated structures and provides for a wider variation in the shape of the part. These materials made from consolidated powdered metals have however generally been limited to being used in applications involving direct currents. Direct current applications, unlike alternating current applications, do not require that the iron particles be insulated from one another in order to reduce eddy currents. Hence, various attempts have been made in the past to form magnetic materials from powders having the desired characteristics necessary for expanded applications including alternating current. For example, U.S. Pat. No. 3,245,841 to Clarke et al. describes a process for producing steel powder by treating the powder with phosphoric acid and chromic acid to provide a surface coating on the steel particles of iron phosphate and chromium compounds. This process however results in poorly bonded material with relatively poor insulating properties. The use of hexavalent chromium in these processes posses a significant health risk since it is carcinogenic. Hence, expensive waste treatment systems must also be employed.

In U.S. Pat. No. 4,602,957 to Pollock, et al., iron powders are treated with oxidizing agents such as potassium or sodium dichromate prior to compaction. The compact is then partially sintered at 600° C. These partially sintered compacts are reported to have increased resistivity and decreased hysteresis losses when compared to bulk iron compacts. The step of sintering the part following compaction, is however, necessary to achieve satisfactory mechanical properties in the part by providing particle to particle bonding and hence strength. However, sintering increases manufacturing complexity and adds to the cost of the finished powder metallurgy part. In addition, sintering causes volume changes and results in a manufacturing process with poor dimensional control.

In other known processes to minimize eddy current losses in ferrous parts made by powder metallurgy, soft iron particles are coated with thermoplastic materials before pressing. U.S. Pat. No. 4,947,065 to Ward et al. and U.S. Pat. No. 5,198,137 to Rutz et al. teach such methods whereby iron powders are coated with a thermoplastic material. This plastic, in principle, is intended to act as a barrier between particles to reduce induced eddy current losses. However, in addition to the relatively high cost of these thermoplastic coatings, there is a considerable further disadvantage to coating the iron powders with plastic. Specifically, plastic has poor mechanical strength compared to the bulk alloy especially at high temperatures and has a tendency to creep. Thus, as a result parts made using plastic-coated iron typically have relatively low mechanical strength. Additionally, many of these plastic-coated powders require a high level of binder when pressed. This results in decreased density of the pressed core part and, consequently, a decrease in magnetic permeability and lower induction (B). Further, this material is normally pressed in a Hot Die resulting in a costly and complex manufacturing process.

Another major drawback exists with these thermoplastic-coated powders. The plastic coatings begin to degrade in the 150–200° C. range, and typically melt or soften at temperatures in the 200–250° C. range. Thus, the applications in which parts made from iron particles coated with thermoplastics can be used are limited to near ambient temperature, low stress applications for which dimensional control is not critical. Furthermore, it is generally not possible to achieve the stress/strain relief benefits of high-temperature annealing i.e., annealing at temperatures in excess of about 150–300° C., with parts made using thermoplastic-coated iron particles. These limitations and disadvantages are also generally true for other known (typically polymeric) coatings for ferrous powders such as, for example, epoxies, phenolics, etc.

Hence, there is an important need in the industry for ferromagnetic powders to produce magnetic parts, particularly soft magnetic parts, that are well bonded (increased green strength, are tolerant of higher temperatures, have good mechanical properties, are configured in relatively complex three-dimensional shapes and have low core loss. There is a particular need for such insulated powders, and parts made therefrom, fabricated by a cost-effective method that provides precise dimensional control. Moreover, there is a need for such powders and parts made therefrom wherein the insulating properties of the coatings do not substantially degrade at relatively high temperatures. There is an additional need for processes for making these powders and the parts made therefrom that results in a highly precise net shaped part.

SUMMARY OF THE INVENTION

Hence, the present invention provides ferromagnetic powder comprising a plurality of ferromagnetic particles having a diameter size of from about 40 to about 600 microns. The particles are coated with an insulating coating comprised of from about 40% to about 85% (and preferably from about 50%) by weight of FeO, $Fe_3O_4$, $Fe_2O_3$, ($Fe_2O_3.H_2O$) or combinations thereof and from about 15% to about 60% (and preferably to about 50%) by weight of $FePO_4$, $Fe_3(PO_4)_2$, $FeHPO_4$, $FePO_4.2H_2O$, $Fe_3(PO_4)_2.8H_2O$, $FeCrO_4$, $FeMoO_4$, $FeC_2O_4$, $FeWO_4$, or combinations thereof. The coating material preferably imparts an electrical insulation value, as determined between adjacent ferromagnetic particles, of at least about 1 milli-Ohm-cm.

The invention is further directed to ferromagnetic powder having a coating that permits adjacent particles to engage one another with a force such that a part made by compressing the coated particles has an as pressed transverse rupture strength of at least about 8 Kpsi (and as high as 18–20 kpsi) as measured in accordance with MPIF Standard 41. Hence, parts made by compressing the ferromagnetic powder according to the present invention have increased green strength as compared with parts made from uncoated powders.

In another embodiment, the ferromagnetic powder according to the present invention has an electrical insulation value as determined between adjacent coated particles that does not substantially degrade when subjected to temperatures of greater than about 150° C. In yet another embodiment, the ferromagnetic powder has a coating that is substantially free of organic materials.

In a further embodiment, the present invention is directed to an oxide-phosphate coating material for ferromagnetic particles. The material comprises from about 50% to about 90% by weight of FeO, $Fe_3O_4$, $Fe_2O_3$, ($Fe_2O_3.H_2O$) or combinations thereof and from about 15% to about 50% by weight of $FePO_4$, $Fe_3(PO_4)_2$, $FeHPO_4$, $FePO_4.2H_2O$, $Fe_3(PO_4)_2.8H_2O$, or combinations thereof. The coating permits adjacent particles to engage one another with a force such that a part made by compressing the coated particles has a transverse rupture strength of at least about 8 kpsi as measured in accordance with MPIF Standard 41.

The invention further pertains to a method of making ferromagnetic powder. The method according to the present invention involves providing a plurality of ferromagnetic particles and treating them with an aqueous solution. The solution comprises from about 5 to about 50 grams per liter of a primary alkaline phosphate, an alkaline chromate, an alkaline tungstate, an alkaline molybdate, an alkaline oxalate or combinations thereof, from about 0.1 to about 20 grams per liter of an oxidizing agent, and from about 0 to about 0.5 grams per liter of a wetting agent, a surfactant or both. The aqueous solution has a temperature of from about ambient to about 60° C. The treating step is performed for a time period of from about 1 minute to about 20 minutes.

The invention is also directed to a method for making soft magnetic parts from the coated particles and to the soft magnetic parts made therefrom.

DETAILED DESCRIPTION OF THE INVENTION

Figure 1:
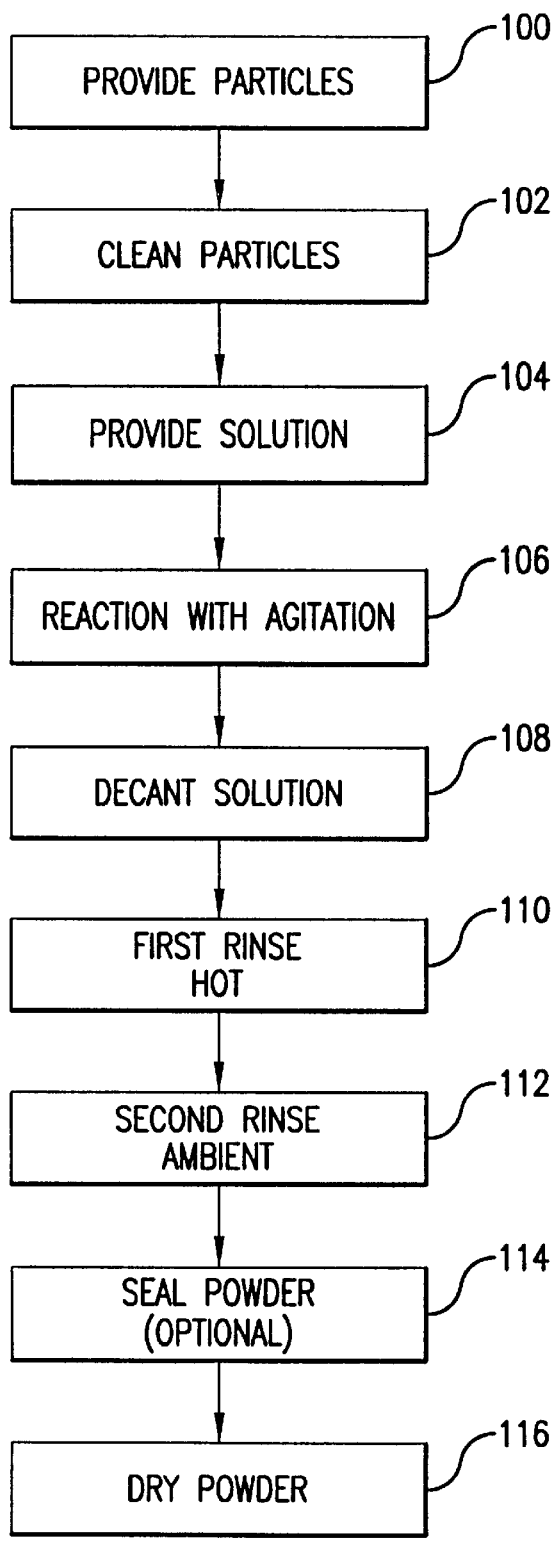
FIG. 1 is a flow chart showing the steps of an exemplary method of making ferromagnetic powder according to the present invention.

The present invention pertains to ferromagnetic powder, a new coating material for the powder, soft and permanent magnetic parts made therefrom and methods for manufacturing both the powders and the parts. As used herein, including in the claims, "magnetic parts" is intended to mean three-dimensional parts comprising ferromagnetic particles that are compacted by the application of pressure thereto as for example in a powder metallurgy press or other suitable device. Such suitable devices include, but are not limited to, an extrusion press and a cold isostatic press.

Ferromagnetic Powder

In one embodiment, the ferromagnetic powder of the present invention comprises ferromagnetic particles covered with a conversion coating. The ferromagnetic particles have an average size in the range of from about 40 to about 600 microns, with the preferred range being from about 100 to about 300 microns. The coating preferably has a thickness of from about 50 to about 5000 Å. In those instances where the powder is to be used in fabricating soft magnetic materials and parts, the coating preferably has a thickness of from about 50 to about 3000 Å.

Moreover, in those instances where the ferromagnetic powder according to the present invention is for use in fabricating soft magnetic material, suitable ferromagnetic particles are particles of iron or iron alloys such as Fe—Si, Fe—Al, Fe—Si—Al, Fe—Ni, Fe—Co, Fe—Co—Ni, or combinations thereof. Typically, alloys of iron have a higher permeability and lower core losses when used in a magnetic circuit when compared with pure iron. However, pure iron functions satisfactorily and provides a higher induction (high B), is softer, is easier to press to high density and is generally lower in cost. The particles may be any suitable particulate material, as for example, but not limited to, powders, fibers, wires and flakes with powders being preferred.

Additionally, when ferromagnetic powder according to the present invention is to be used in fabricating permanent magnet materials and parts, suitable particles are particles of carbon steel (0.9 C, 1 Mn), Tungsten steel (0.7 C, 0.3 Cr, 6 W), 3.5% Cr Steel (0.9 C, 0.35 Cr), 15% Co Steel (1.9 C, 7 Cr, 0.5 Mo, 15 Co), KS Steel (0.9 C, 3 Cr, 4 W, 35 Co), MT Steel (2.0 C, 8.0 Al), Vicalloy (52 Co, 14 V), MK Steel (16 Ni, 10 Al, 12 Co, 6 Cu), Pt—Fe, iron powder (100 Fe), FeCo (55 Fe, 45 Co), shock resisting tool steel (0.5 C, 1.40 Mo, 3.25 Cr) or combinations thereof. In such instances, the aforementioned coating should preferably have a thickness of from about 50 to about 1000 Å. This coating also provides lubricity to the powders during pressing. Therefore the need to add an organic lubricant to the powder mass prior to pressing is effectively eliminated.

The ratio (weight) between the phosphate, molybdate, tungstate or oxalate component and the oxide component of the coating should be selected so as to influence the properties of the coating. For example, if the weight percentage of the phosphate, molybdate, tungstate or oxalate component is relatively high, then a poor bond between the coating and the ferromagnetic particles may result. However, the insulation value of the coating typically increases with increases in such weight percentage. On the other hand, the ability of the coating to bond with the ferromagnetic particles increases as the weight percentage of the oxide increases. This improvement in bonding may occur at the expense of the insulation value of the coating.

Hence, the coating disposed on each of the ferromagnetic particles should preferably comprise from about 40% to about 85% by weight and most preferably from about 65% to about 80% by weight of either FeO, $Fe_3O_4$, $Fe_2O_3$, ($Fe_2O_3.H_2O$) or combinations thereof; and from about 15% to about 60% by weight and most preferably from about 20% to about 35% by weight of $FePO_4$, $Fe_3(PO_4)_2$, $FeHPO_4$, $FePO_4.2H_2O$, $Fe_3(PO_4)_2.8H_2O$, $FeCrO_4$, $FeMoO_4$, $FeC_2O_4$, $FeWO_4$, and combinations thereof, with $FePO_4$, $Fe_3(PO_4)_2$, $FeHPO_4$, $FePO_4.2H_2O$, $Fe_3(PO_4)_2.8H_2O$, and combinations of these being preferred. In those embodiments of the powder when an oxide/phosphate coating is used as the coating on the ferromagnetic particles, the weight ratio is preferably selected so that the composition of the coating approximates that of the mineral Vivianite (i.e., $Fe_3O_4+Fe_3(PO_4)_2-8H_2O$) and hence comprises a "Vivianite-like" material. In a preferred embodiment, the coating is substantially free of organic materials.

The present invention should not however be construed as being limited to ferromagnetic particles having a conversion coating of a specific composition disposed thereon. Rather, the mechanical and electrical insulation properties, of the coating as described below, should direct selection of coating composition.

The coating on the particles of the ferromagnetic powder of the present invention should preferably exhibit a number of properties. First, the coating should be as thin as possible, consistent with the requirement that the coating electrically insulate adjacent particles such that an insulation value of about at least 1 to about 20 milli-Ohm-centimeter is achieved in a part fabricated therefrom, with higher values in, or even above, this range being preferred. The coating on each of the ferromagnetic particles preferably has an electrical insulation value, as determined between adjacent particles, of at least about 1 milli-Ohm-cm.

Thicknesses in the range of from about 1,000 to about 5000 Å are preferred for the coating when its electrical insulation value falls within the range identified above, with a thickness of about 2000 Å being an especially preferred average thickness value.

The coating should preferably permit adjacent particles to bind together with sufficient force that a part made by compacting the ferromagnetic powder of the present invention has sufficient transverse rupture strength so that sintering after compaction is generally not required to obtain good mechanical properties. As used above, "sufficient transverse rupture strength" should be construed as meaning a transverse rupture strength in the range of from about at least 8 kpsi to about 20 kpsi, and preferably at least about 15 kpsi as determined in accordance with the protocol of the American Society of Test Materials MPIF Standard 41.

The coating on the ferromagnetic powders according to the present invention should preferably exhibit lubricating properties, particularly during the initial stages of pressing operations when the coated powders are used to fabricate soft magnetic parts. This lubricating feature should optimally permit the particles to slip and slide by each other during pressing, thereby minimizing or eliminating point-to-point welding of the particles. As a result, a denser, and hence stronger, soft magnetic part is manufactured. Additionally, this lubricating property facilitates part ejection from the dies thereby decreasing overall manufacturing time and hence manufacturing cost.

The ferromagnetic powder according to the present invention preferably has an electrical insulation value that does not substantially degrade when it is subjected to temperatures of greater than about 150° C. Hence, the coating is able to withstand relatively high temperatures, i.e. temperatures above about 150° C., without degrading. This permits use of magnetic parts made from the ferromagnetic powder of the present invention to be used in applications where soft magnetic parts made from plastic-coated particles cannot be used due to degradation (typically above about 150° C.) and melting (above about 200 to 250° C.) of the coating. Examples of such applications include, but are not limited to, automotive parts such as stators, rotors, actuators, armatures, solenoids and motors used in the engine compartment of gasoline or diesel motors. In addition, this high temperature tolerance permits magnetic parts made from the ferromagnetic powder of the present invention to be annealed at relatively high temperatures, i.e. temperatures in the 250 to 450° C. range, so as to reduce stress in the parts and consequently reduce core loss.

Additionally, the coating of the present ferromagnetic particles should preferably be able to withstand relatively low temperatures, i.e. temperatures in the 20 to 200° K. range. This characteristic permits such parts to be used in cold operating environments, i.e., environments in the −60° C. to 0° C. temperature range, without degradation or embrittlement of the coating. Examples of such environments are found in colder climates and jet airplanes.

The present invention is also directed to a coating material for ferromagnetic particles. The coating material according to the present invention preferably comprises from about 50% to about 85% and most preferably, from about 65% to about 80% by weight of FeO, $Fe_3O_4$, $Fe_2O_3$, ($Fe_2O_3 \cdot H_2O$) or combinations thereof; and from about 15% to about 50% and most preferably from about 20% to about 35% by weight of $FePO_4$, $Fe_3(PO_4)_2$, $FeHPO_4$, $FePO_4 \cdot 2H_2O$, $Fe_3(PO_4)_2 \cdot 8H_2O$, or combinations thereof. This coating is primarily an oxide in composition. In a preferred embodiment, the coating comprises a Vivianite-like material.

The coating according to this embodiment of the present invention preferably permits adjacent particles to engage one another with a force such that a part made by compressing ferromagnetic particles having the coating disposed thereon has an as pressed transverse rupture strength of at least about 8 kpsi and most preferably greater than about 15 kpsi, as measured in accordance with MPIF Standard 41. Furthermore, the present coating preferably has an electrical insulation value of at least about 200 micro-Ohm-cm, as determined between adjacent ferromagnetic particles having said coating disposed thereon. Preferably, this electrical insulation value does not substantially degrade when subjected to temperatures of greater than about 150° C. For purposes of this invention substantially should be construed to mean not more than about 5% at temperatures up to about 300° C. In an embodiment of the coating according to this invention, it is substantially free of organic materials.

Method of Making Ferromagnetic Powder

In another embodiment, the present invention is directed to a method of making ferromagnetic powders having the properties described above. A preferred method of making ferromagnetic powder in accordance with the present invention comprises providing a plurality of ferromagnetic particles; and treating the particles with an aqueous solution. The particles preferably have a diameter of from about 40 to about 300 microns. Examples of suitable ferromagnetic particles for use in the present invention method when used for making powders for soft magnetic materials and parts, include, but are not limited to, particles of Fe, Fe—Si, Fe—Al, Fe—Si—Al, Fe—Ni, Fe—Co, Fe—Co—Ni, and combinations thereof. Examples of suitable ferromagnetic particles for use in the present method when used for making powders for permanent magnetic materials and parts, include, but are not limited to, particles of shock resisting tool steel (0.5 C, 1.40 Mo, 3.25 Cr), carbon steel (0.9 C, 1 Mn), Tungsten steel (0.7 C, 0.3 Cr, 6 W), 3.5% Cr Steel (0.9 C, 0.35 Cr), 15% Co Steel (1.9 C, 7 Cr, 0.5 Mo, 15 Co), KS Steel (0.9 C, 3 Cr, 4 W, 35 Co), MT Steel (2.0 C, 8.0 Al), Vicalloy (52 Co, 14 V), MK Steel (16 Ni, 10 Al, 12 Co, 6 Cu), Pt—Fe, iron powder (100 Fe), FeCo (55 Fe, 45 Co) and combinations thereof.

A preferred aqueous solution for treating the ferromagnetic particles comprises from about 1 to about 50 and preferably from about 10 to about 20 grams per liter of a primary alkaline phosphate, an alkaline chromate, an alkaline tungstate, an alkaline molybdate, an alkaline oxalate or combinations thereof. Examples of primary alkaline phosphates suitable for use in the present method include, but are not limited, to $KH_2PO_4$, $NaH_2PO_4$, $NH_4H_2PO_4$ and combinations thereof.

The aqueous solution for treating the ferromagnetic particles in accordance with the present inventive method preferably comprises from about 0.1 to about 50 grams per liter of either an organic or an inorganic oxidizing agent. Examples of inorganic oxidizing agents suitable for use in the present invention include, but are not limited to, from about 0.3 to about 50, and preferably from about 0.5 to about 5 grams per liter of $KNO_3$ or $NaNO_3$, from about 0.1 to about 50 and preferably from about 5 to about 10 grams per liter of $NaClO_3$ or $NaBrO_3$, from about 0.1 to about 50 and preferably from about 0.1 to about 0.3 grams per liter of $KNO_2$ or $NaNO_2$, from about 0.01 to about 0.1 and preferably from about 0.03 to about 0.06 grams per liter $H_2O_2$. Additionally, from about 0.1 to about 2 grams per liter of hydroxylamine or hydroxylamine sulfate, from about 0.1 to about 2 grams per liter of hydrazine and combinations thereof are suitable for use as accelerators of the present process.

Examples of organic oxidizing agents suitable for use in the present invention method include, but are not limited to, sodium m-nitrobenzene, nitrophenol, dinitrobenzene sulfonate, p-nitrobenzoic acid, nitrophenol nitroguanidine, nitrilloacetic acid and combinations thereof. Organic oxidizers are preferably used in an amount which is from about 0.3 to about 10 and most preferably from about 0.5 to about 2.5 grams per liter. Alternatively (or additionally), phosphoric acid may be used in an amount which is from about 0.1 to about 5 grams per liter of solution.

In certain embodiments, the aqueous solution further comprises from about 0 to about 0.5 grams per liter and preferably from about 0.1 to about 1 gram per liter of a wetting agent, a surfactant or both. Examples of surfactants preferred for use in the present method include, but are not limited to, sodium dodecyl benzyl sulfonate, lauryl sulfate, oxylated polyethers, ethoxylated polyethers and combinations thereof.

The aqueous solution should preferably have a temperature of from about ambient to about 60° C. and most preferably from about 25° C. to about 50° C. The treating step is preferably performed for a time period of from about 1 minute to about 20 and most preferably from about 2 to about 10 minutes. The aforementioned temperatures and time periods are exemplary only. Preferably, the time period is long enough to permit the pH of the aqueous solution to come to equilibrium. Such pH change is preferably an overall increase of about 20%. The pH starting value of the solution depends on the detailed chemistry of the aqueous solution. However, in preferred aqueous solutions for use in the present invention, the starting value of the pH is from about 5 to about 6. An exemplary pH change in the aqueous solution would for purposes of the present invention involve an increase from a starting pH of about 5.5 to and end point pH of from about 6.1 to about 6.5. Higher or lower temperatures and pH's and longer or shorter time periods for treating the ferromagnetic particles are of course also within the scope of the present invention.

The method according to the present invention may further comprise the steps of rinsing the particles to remove the aqueous solution and drying the particles. The process optionally comprises a chromate, molybdate or nitrate rinse to inhibit subsequent oxidation of the coated powders.

The method as described hereinabove can be summarized with reference to FIG. 1, wherein the first step of the method, identified at box 100, is providing a plurality of ferromagnetic particles having an average size in the range of 40 to 600 microns, with the preferred range being 60 to 300 microns. As those skilled in the art will appreciate, the specific weight or volume of ferromagnetic particles provided in the first step of the method will, of course, vary depending upon whether the ferromagnetic powder is manufactured using a batch or a continuous process, and will depend upon the design of the equipment used to carry out the process. In examples of the method of making ferromagnetic particles provided below, an exemplary quantity of ferromagnetic particles is provided.

Optionally, as identified at box 102, the particles are cleaned in warm alkaline solution to remove any organic or surface contamination. Preferably, this cleaning step is carried out by immersing the particles in the solution, although spraying and any other techniques for contacting the particles with the cleaning solution under suitable conditions and for a suitable time to remove any unwanted contamination can also be used. An example of a suitable cleaning solution comprises an aqueous solution of about 30 grams/liter NaOH, about 30 grams/liter $Na_2CO_3$, about 30 grams/liter $Na_3PO_4$ and about 5 grams/liter $Na_2SiO_3$. The optional cleaning solution is preferably maintained at a temperature of from about 90 to about 95° C., and the particles are preferably immersed in the solution for about 15 to about 30 minutes. If spraying or other techniques are used to contact the particles with the cleaning solution, it is well within the skill of one of skill in the art to determine the appropriate duration for contacting the particles with the cleaning solution. However, an exposure in the 1 to 10 minute range is generally satisfactory. This cleaning step can further comprise decanting the cleaning solution and rinsing the thus cleaned particles in water having a temperature of from about 50 to about 60° C. This rinsing step is preferably performed several, e.g. three, times, using clean water for each rinse cycle. Thereafter, one or more cold water rinses of the particles is(are) performed, with the rinse water being decanted after each rinse and replaced with fresh water.

As the next step in the method, an optional acid dip (not shown) may be carried out. This optional step is carried out at ambient temperatures (i.e. from about 20 to about 25° C.) wherein the particles are subjected to dilute acid at a concentration of about 0.1% to about 0.5% by weight for a time period of about 3 minutes followed by a rinse (three times). This etching step is used to remove contamination, in particular sulfur compounds from the surface. In the subsequent step as identified by box 104, the particles are subjected to a solution that reacts with the particles so as to create a conversion coating. The weight ratios and electrical and mechanical properties of the coating, described above, are the key factors to be considered in selecting the solution and process parameters for creating the conversion coating on the ferromagnetic particles.

Referring again to the step identified by box 104 in FIG. 1, a solution suitable for achieving the oxide/phosphate coating comprises ammonia dihydrogen phosphate, sodium nitrate, phosphoric acid or one or more oxidizing agents. The ratio of these constituents of the solution, and the process parameters used in the coating process are selected so that following reaction with the ferromagnetic particles a conversion coating having the characteristics described above results.

At the step identified by box 104 in FIG. 1, the ferromagnetic particles are subjected to the solution by preferably immersing the particles in the same. Alternatively, the solution may be sprayed on the particles or brought into contact with the particles using other known techniques.

Next, at the step identified by box 106, the solution is permitted to react with the particles so as to form the conversion coating. The specific time for this reaction step will vary with the precise chemistry of the solution, the pH and temperature of the solution, and the size of the particles used. However, a reaction time of from about 1 to about 20 minutes, and most preferably from about 2 to about 10 minutes, is typically sufficient. Preferably, the particles are agitated and mixed during the reaction by known mechanical means to ensure as many of the particles as possible react with the solution. The end point of the reaction should preferably be determined to be the point at which the pH of the solution stops changing (i.e., reaches equilibrium). With continuing reference to FIG. 1, as the next step in the process of making the ferromagnetic powder of the present invention, identified by box 108, the conversion coating solution is decanted.

The particles are then subjected to several rinse cycles to eliminate any solution remaining after the decanting step. The first rinse step, identified by box 110, involves subjecting the particles to hot water having a temperature of about 50 to 60° for about 4 to 6 minutes. Preferably, the particles are immersed in hot water, but spray or other known techniques for applying the hot water may also be used. The particles are preferably agitated mechanically during the rinsing step to enhance rinsing action. The hot water is then decanted. Preferably, this first rinse step is repeated once or twice.

The second rinse step, identified by box 112, is identical to the first rinse step, except that cold water having a temperature of about 10 to 20° C. is used. Thus, the particles are preferably immersed in the cold water, but the latter may also be applied using spray or other known techniques. The rinse process preferably lasts about 4 to 6 minutes, and mechanical agitation is preferably applied during the process. The cold water rinse is preferably repeated once or twice. Rinsing agents such as alcohol to reduce the surface tension of water may also be employed. Then, as identified by box 116, the ferromagnetic powder is dried. A preferred method for drying in laboratory scale batches comprises placing powder in a large Buchner funnel and applying a vacuum thereto for from about 5 to about 10 minutes. Any known method for drying powdered materials can however be employed.

As an optional step prior to drying (box 114), the ferromagnetic powder may be sealed to prevent rusting (oxidation). This sealing step may be done using any known process for sealing powders such as chromating, etc.

EXAMPLE 1

One hundred (100) grams of substantially pure iron (99.87%) particles (Quebec Metal Powders, Atomet 590) having a mean particle size of about 80 microns are cleaned by immersion into an aqueous solution of about 30 grams/liter NaOH, about 30 grams/liter $Na_2CO_3$, about 30 grams/liter $Na_3PO_4$ and about 5 grams/liter $Na_2SiO_3$ maintained at a temperature of from about 90 to about 95° C. for a time period of about 20 minutes. The clean particles are placed in a beaker and a solution containing 5 g/l of $NH_4H_2PO_4$, 0.3 g/l $NaNO_3$, 5 g/l $NaNO_3$ is added to the beaker so that the particles are completely immersed in the solution. The solution has a pH of about 5.5 and is maintained at a temperature of about 40° C. The particles are then stirred continuously with a glass rod to ensure as many of the particles as possible contact the solution. After about 2 minutes of this immersion and stirring the solution is decanted.

Immediately thereafter, hot water having a temperature of about 55° C. is added to the beaker so that the particles are fully immersed. The particles remain immersed in the water for about 5 minutes, and are agitated to enhance rinsing action. The hot water is decanted and this hot water rinse step is repeated two times. Thereafter, cold water at a temperature of from about 10° C. to about 20° C. is added to the beaker so that the particles are immersed. Following about a 5 minute immersion with agitation, the cold water is decanted. Then, this cold water rinse step is repeated once.

The particles are then sealed with chromate by immersing them for about 1 minute in a solution comprising 200 ppm of $CrO_3$ and 200 ppm of $H_3PO_4$ in dionized water. The solution has a pH of about 4 and is maintained at room temperature. The chromate solution is then decanted and the particles are dried in the manner described above.

The oxide/phosphate-coated ferromagnetic powder made in accordance with the process described in Example 1 is analyzed as follows. First, the coating on 5 samples of the powder from Example 1 is analyzed by Energy Dispersive X-Ray Spectrometer (EDAX) to determine the composition of the coating. The results are as follows as reported in Table 1.

TABLE 1

| Sample | Element Weight Percent | | | | Atomic Percent | | |
| --- | --- | --- | --- | --- | --- | --- | --- |
| | O | P | Fe | Total | O | P | Fe |
| 1 | 7.37 | 1.21 | 96.15 | 104.73 | 20.74 | 1.76 | 77.51 |
| 2 | 16.26 | 4.00 | 84.46 | 104.79 | 38.34 | 4.85 | 56.80 |
| 3 | 11.95 | 2.86 | 92.08 | 106.88 | 30.02 | 3.71 | 66.28 |
| 4 | 18.56 | 4.30 | 81.48 | 104.34 | 42.06 | 5.03 | 52.91 |
| 5 | 16.26 | 4.08 | 81.87 | 102.21 | 38.87 | 5.04 | 56.09 |

The powder is then pressed at 60 tons/in$^2$ into a torrous which was measured by an AC magnetic hysteresis instrument and is determined to have a maximum inductance-related to coating thickness of about 12.3 kGauss at 40 Oersted applied field.

To measure the binding strength between adjacent particles, a soft magnetic part having the shape of a bar is made using the ferromagnetic powder from Example 1 in accordance with MPIF Standard 41. The transverse rupture strength of the bar is determined without any follow-on processes such as annealing or sintering, also in accordance with this MPIF standard. The part was determined to have a transverse rupture strength of 18,000 pounds/square inch.

To determine the ability of the oxide/phosphate coating to withstand degradation in temperatures above 150° C. and below −50° C., additional soft magnetic parts made using ferromagnetic powder from Example 1 are fabricated in accordance with MPIF Standard 41. Some of these parts are then annealed at a temperature reaching 400° C. and others are subjected to temperatures reaching −70° C. Subsequent analysis of the parts in accordance with MPIF Standard 41 reveal no decrease in transverse rupture strength. In addition, other analyses indicates an improvement in permeability, saturation induction and core loss of the part after the anneal. Further testing at 300° C. is done and no degradation in transverse rupture strength is measured.

Method of Making Soft Magnetic Parts

The present invention is further directed to a method of making soft magnetic parts. As the first step in this method, a source of the ferromagnetic powder of the present invention is provided. This powder may be obtained using the method of making ferromagnetic powder as described above or by using other methods, the only requirement being that the ferromagnetic powder have the properties described above. The plurality of ferromagnetic particles are coated with a coating that permits adjacent particles to engage one another with a force such the resultant part has an as pressed transverse rupture strength of at least 8 kpsi, as measured in accordance with MPIF Standard 41. Preferably the coating is insulating and its electrical insulation value does not degrade at temperatures over 150° C.

Each of the particles in the part is preferably coated with a material comprising from about 40% to about 85% by weight of FeO, $Fe_3O_4$, $Fe_2O_3$, ($Fe_2O_3.H_2O$) or combinations thereof; and from about 15% to about 60% by weight of $FePO_4$, $Fe_3(PO_4)_2$, $FeHPO_4$, $FePO_4.2H_2O$, $Fe_3(PO_4)_2.8H_2O$, $FeCrO_4$, $FeMoO_4$, $FeC_2O_4$, $FeWO_4$, or combinations thereof. The coating material preferably comprises an oxide and a phosphate conversion coating. In this preferred coating, the oxide and phosphate preferably have a weight ratio of from about 2 parts oxide to about 4 parts oxide to about one part phosphate. The coating is most preferably a Vivianite-like material. In some embodiments, the coating is substantially free of organic materials.

Preferably, the coating step in the method for making the soft magnetic parts is comprised of treating the particles with an aqueous solution comprising from about 5 to about 50 grams per liter of a primary alkaline phosphate, an alkaline chromate, an alkaline tungstate, an alkaline molybdate, an alkaline oxalate or combinations thereof. The solution further comprises from about 0.1 to about 20 grams per liter of an oxidizing agent, and from about 0 to about 0.5 grams per liter of a wetting agent, a surfactant or both. The aqueous solution should preferably be maintained at a temperature of from about 30° C. to about 60° C., and the treatment step should be carried out for a time period of from about 1 minute to about 20 minutes.

The coated particles are consolidated by uni-axial pressing into a part. This step preferably comprises compacting the ferromagnetic powder to a density approximating "full density", i.e., the density at which the coated particles making up the part have at least non-interconnected porosity and preferably no porosity. Hence, the as pressed density of this part is from greater than about 7.4 g/cc and preferably about 7.4 to about 7.6 g/cm$^3$.

This compacting step is preferably effected with powder dies and presses, both traditional and non-traditional. However, other techniques may also be satisfactorily employed to compact the coated particles. These techniques include, but are not limited to, high velocity projection (similar to thermal spraying), roll-bonding, hot isostatic pressing (hipping), cold isostatic pressing (cipping), forging, powder extruding, coining or rolling the ferromagnetic powder. In instances where the ferromagnetic powder is compacted using a conventional die and uni-axial powder press, a preferred pressure for obtaining the desired densities is from about 25 tons/square inch to about 60 tons/square inch. The step of compacting is preferably done at room temperature.

An important advantage of soft magnetic parts made in accordance with the present invention is that high-temperature sintering of the part is generally not required after compaction in order to obtain desired densities and mechanical properties in the part. Hence, the present invention is also directed to a method of making parts having increased green strength as pressed).

Hence, the part is removed from the die and following removal of the soft magnetic part from the press or other apparatus, it may be desirable to subject the part to a low temperature anneal to reduce internal stress (coercive strain). This optional annealing step also serves to improve the magnetic properties of the resultant part. This occurs because the large stresses induced by compacting the powders in the die typically increase the coercive force $H_c$ of the part. These increases in $H_c$ may therefore result in increases in core losses in the part to a level which may or may not be acceptable depending upon the intended operating temperature and application frequency of use. A low-temperature anneal is typically carried out by placing the part in an oven in a non oxidizing environment and gradually heating. Alternatively, coercive strain in the part may be reduced by any other known methods for doing so.

EXAMPLE 2

Compaction:

In an exemplary method of making a soft magnetic part in accordance with the present invention, nine (9) grams of the ferromagnetic powder of the present invention made in accordance with the process of Example 1, described above, is charged into a 1" diameter, 0.8" interior diameter torroidal die mounted in a uni-axial 50 ton hydraulic press (Dake 50 H) and is compacted at a pressure of 60 tons/square inch. The resultant pressed torrous is removed from the die and then subjected to a low-temperature anneal for 30 minutes at a temperature of 250° C. to 300° C. in a non-oxidizing environment at a ramp rate of less than 3°/second.

Figure 2:
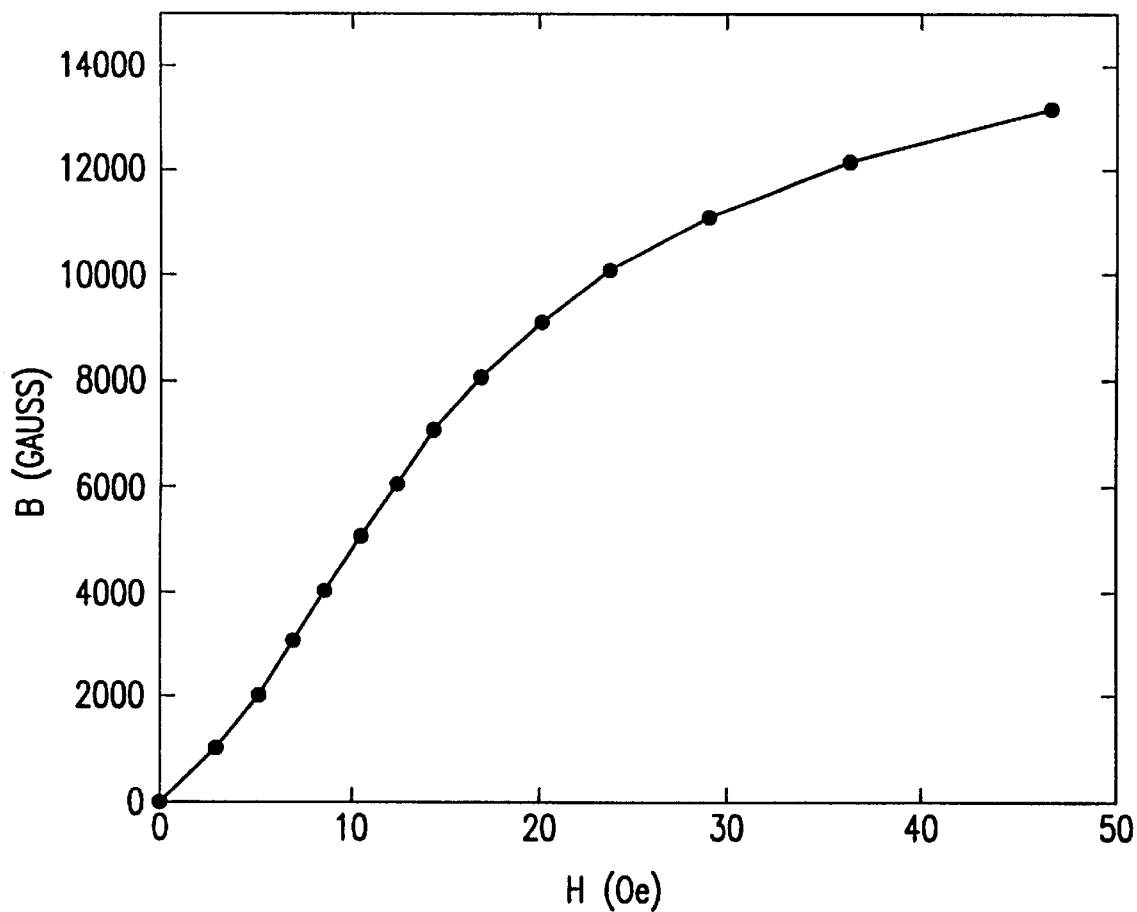
FIG. 2 is a graph showing direct current characteristics of a part made in accordance with the present invention.

Magnetic analysis:

Two coils are wound on the torrous using 24 gauge insulated copper transformer wire. Each coil has 50 turns of wire, tightly wound through the center of the annulus. A current of 8 amps is applied through the first coil. The second coil is connected to a 16-bit A/D converter and then to a computer to record data. The current is applied by a galvanostat having a frequency response that is not dependent on frequency at frequencies up to about 18 KHz. The current waveform is determined by a voltage waveform supplied by a function generator galvanostat. This device and associated software is known as a magnetic hysteresis instrument. The waveform is a sine wave applied at frequencies that vary from about 1 Hz to about 600 Hz. The results of this analysis are as follows:

Saturation Induction:

Direct current characteristic is shown in FIG. 2 wherein applied field is varied from 0 to 43 Oersted and induction recorded by a magnetic hysteresis instrument.

Figure 3A:
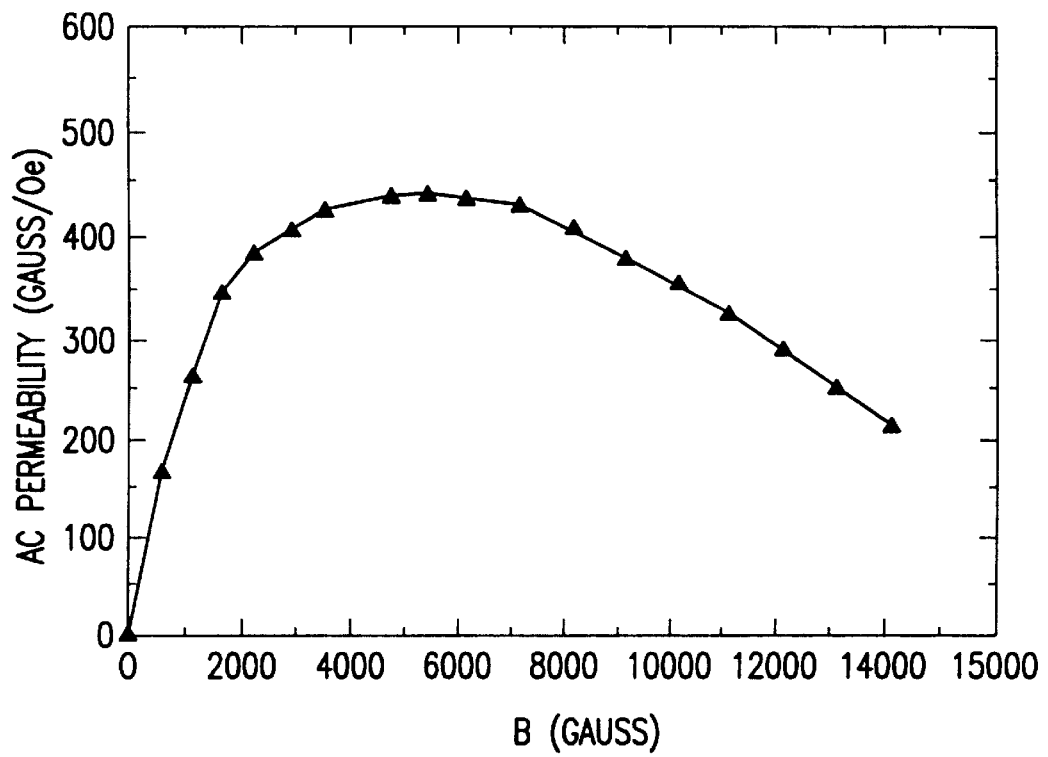
FIG. 3 are graphs showing permeability of a part made in accordance with the present invention as a function of induction (FIG. 3a) and as a function of applied field (FIG. 3b)
Figure 3B:
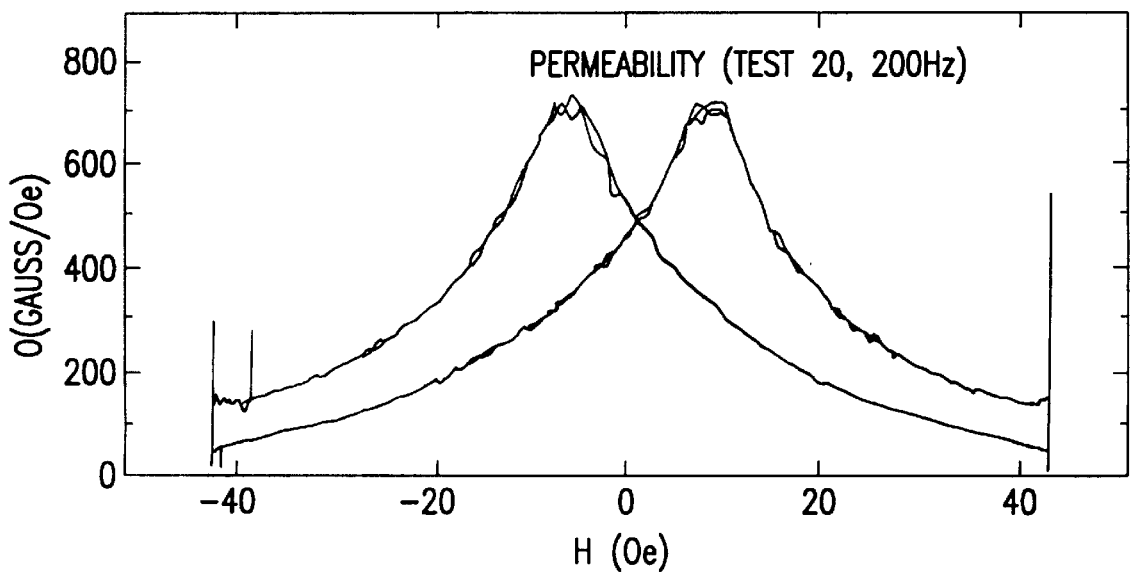

Permeability:

Permeability as a function of induction is shown in FIG. 3*a* and instantaneous permeability (dB/dH) as a function of applied field in FIG. 3*b*. Note that for specimens measured at 200 Hz, maximum value occurs at $H_c$.

Figure 4:
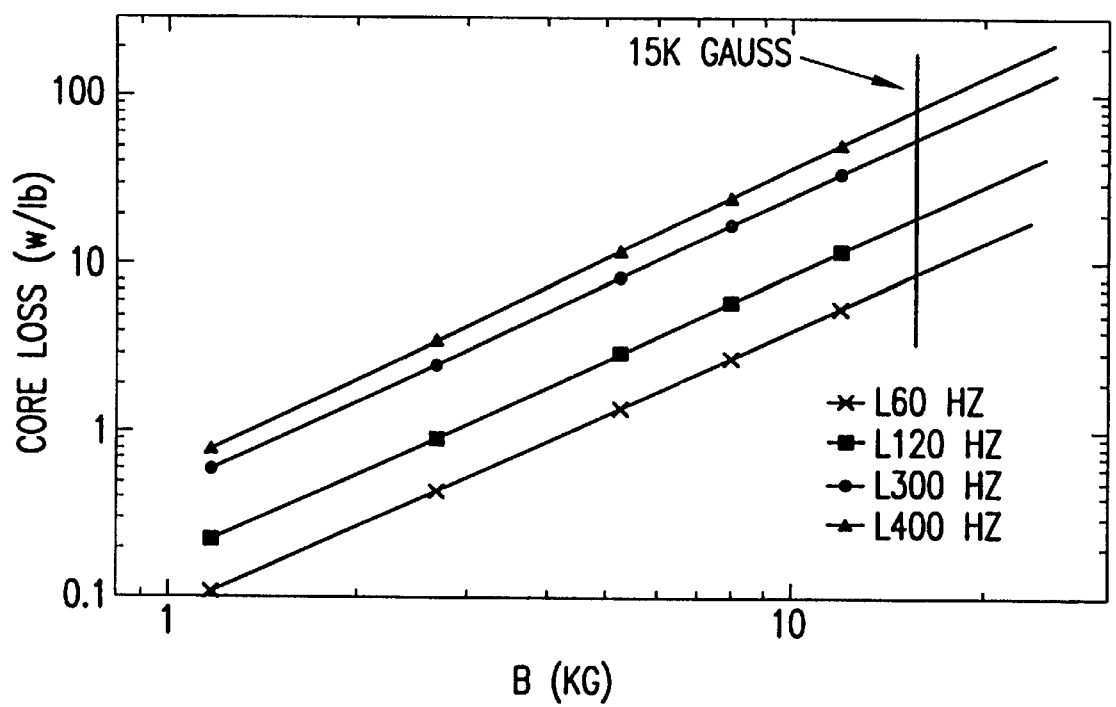
FIG. 4 is a graph showing core loss as a function of induction for a part made in accordance with the present invention.

Core loss (watts/pound):

FIG. 4 shows core loss as a function of induction for the part. Core loss is measured by integrating B v. H curve and is illustrated at frequencies of 60, 120, 300 and 900 Hz.

Mechanical Properties:

A second specimen is made in the shape of a bar by placing 18 grams of powder made according to Example 1 into a rectangular die and pressing the powder at 60 kpsi. The specimen is then tested according to MPIF testing protocols. The results of this analysis are shown as follows in Table 2:

TABLE 2

| Nominal Transverse Rupture Stress (MPIF Standard 41) 18 kpsi | |
| --- | --- |
| Tensile Stress (ASTM E8) | 60 kpsi |
| Rockwell Hardness B scale (ASTM A370) | $R_B$ 75 |
| Vickers Microhardness (ASTM E384 50 grams) | 260 Kgf/mm$^2$ |

Soft Magnetic Part

The present invention is further directed to a soft magnetic part comprising a three-dimensional structure. The structure is comprised of consolidated ferromagnetic particles having a coating of a material having an electrical insulation value that does not degrade at temperatures above 150° C. The magnetic part according to the present invention preferably has a transverse rupture strength as determined in accordance with MPIF Standard 41, of at least about 8 kpsi and most preferably from about 12 kpsi to about 20 kpsi. Preferably, a soft magnetic part according to the present invention has an electrical insulation value which is at least about 1 milli-Ohm-cm, as determined between adjacent ones of consolidated coated ferromagnetic particles.

A soft magnetic part according to the invention comprises a three-dimensional structure of consolidated ferromagnetic particles coated with a conversion coating material. The material preferably comprises from about 2 to about 4 parts by weight of an oxide to one part of a chromate, molybdate, oxalate, phosphate, tungstate or combinations thereof. The coating may be substantially free of organic materials.

The present invention also includes a stator for an alternating current generator. It should be understood that the present invention should not be construed as to be limited to a soft magnetic part having the shape of a stator. Instead the invention should be construed to include other ferromagnetic parts having their own respective three dimensional shapes. Hence, the present invention magnetic part includes all magnetic motor and generator parts, armatures, rotors, solenoids, linear actuators, gears, ignition cores, transformers (feedback, horizontal flyback, power conditioning, ferroresonant), ignition coils, converters, inverters and the like.

Figure 7:
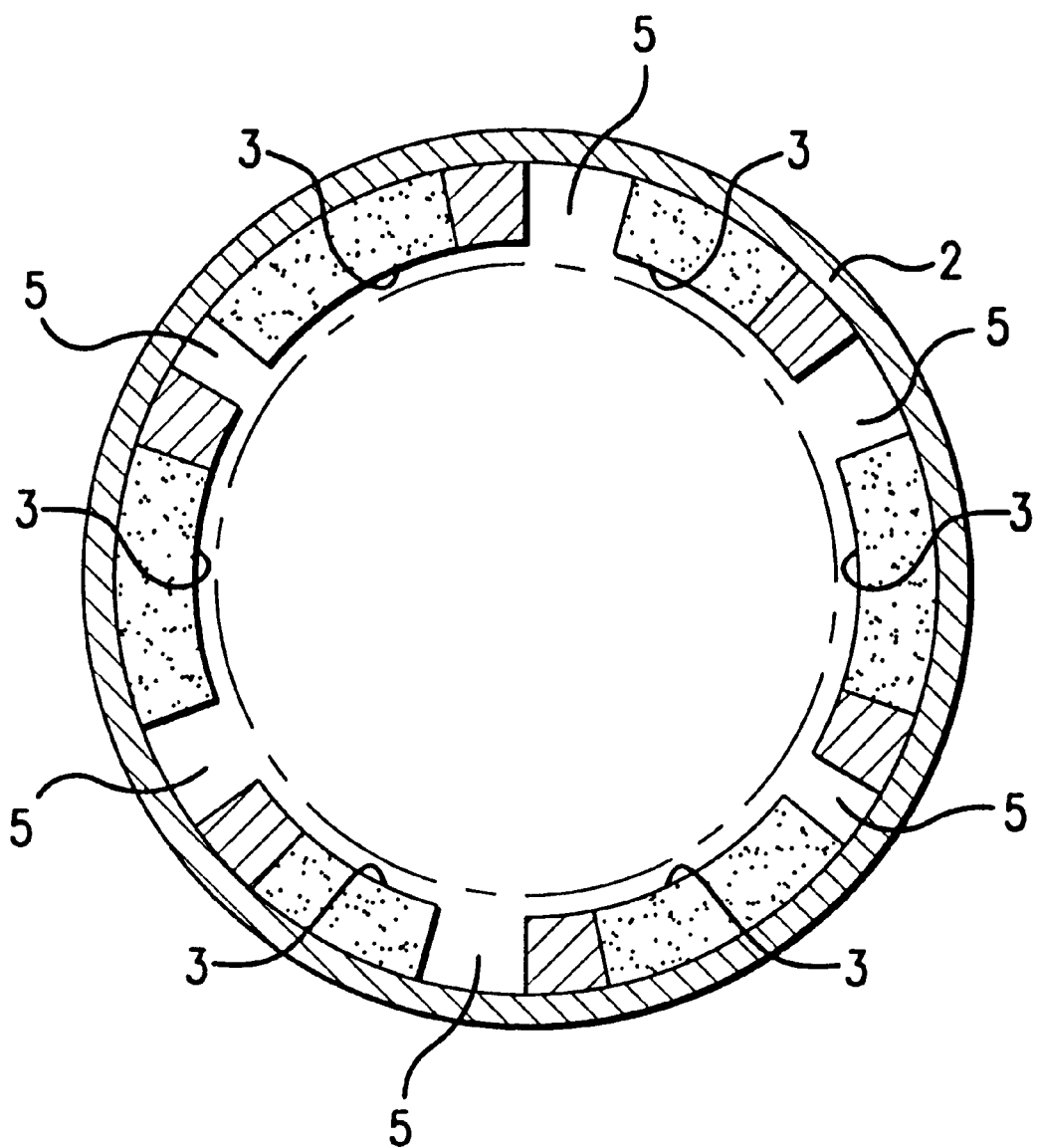
FIG. 7 is a cross sectional view of a stator according to the present invention.
Figure 8A:
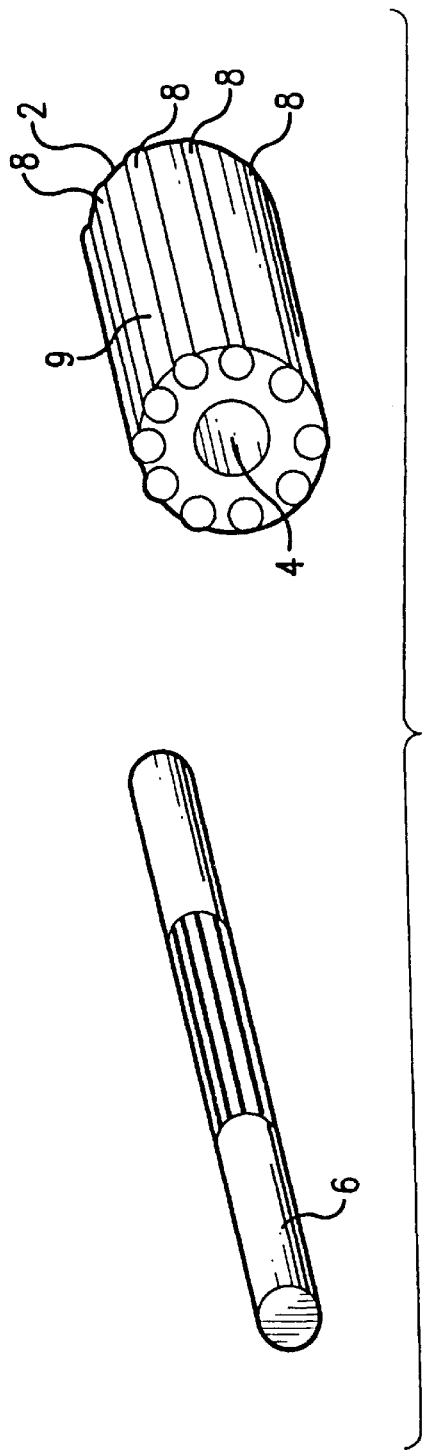
FIG. 8 is an exploded view of an armature assembly according to the present invention.
Figure 8B:
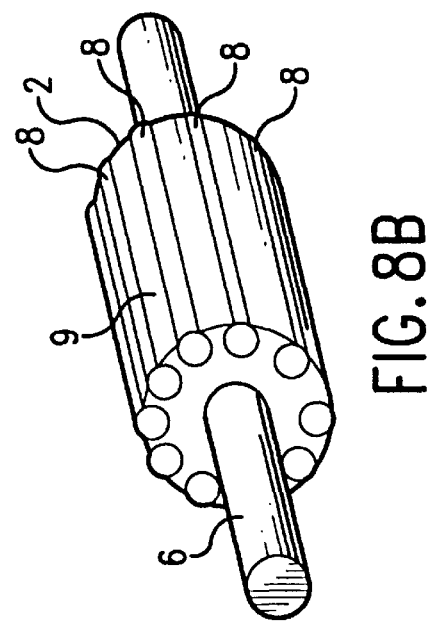

A stator in accordance with the present invention comprises a plurality of ferromagnetic particles that are consolidated in the shape of a stator core. A preferred shape for the stator core can be seen in FIG. 7 wherein annular yoke 2 has a plurality of integral inner circumferentially spaced projections 3 radiating and extending inwardly and defining slots 5. Each of the ferromagnetic particles has a coating of a material that has an electrical insulation value that does not degrade at temperatures above 150° C. The core has an as pressed transverse rupture strength, as determined in accordance with MPIF Standard 41, of at least 8 kpsi. In a stator according to the present invention, the electrical insulation value is preferably at least about 1 milli-Ohm-cm, as determined between adjacent consolidated coated ferromagnetic particles.

EXAMPLE 3

An exemplary stator for an alternating current generator according to the present invention is made using a powder die mounted in a 220 ton hydraulic press (Cincinnati 220). The die has a cavity with a configuration corresponding to that of the stator. More particularly, the die has an annular cavity with a plurality of slots communicating with the cavity and extending radially inwardly from the cavity. The ferromagnetic powder of the present invention made in accordance with the process used for Example 1, described above, is charged into the die and is compacted at a pressure of 30 tons/square inch. The resultant pressed stator is removed from the die. The stator is then subjected to a low-temperature anneal. (250 to 300° C., <3°/second for 30 minutes in an inert atmosphere).

Magnetic Analysis:

Coils of wire are wound on each of the radially inwardly extending "fingers" or poles of the stator using 24 gauge insulated copper transformer wire. Each coil has 25 turns of wire, tightly wound around each finger. A current of 0.25 amps (300 Hz) is applied through the first coil and a hall probe placed at the end of the pole and the field value recorded as 30 Gauss.

Transverse Rupture Strength Analysis:

A second stator is made as described immediately above and a rectangular section is mechanically sawed out and removed. This specimen is tested for transverse rupture strength (MPIF Standard 41). The results of this analysis indicate the stator has a transverse rupture strength of 18 kpsi.

Figure 5:
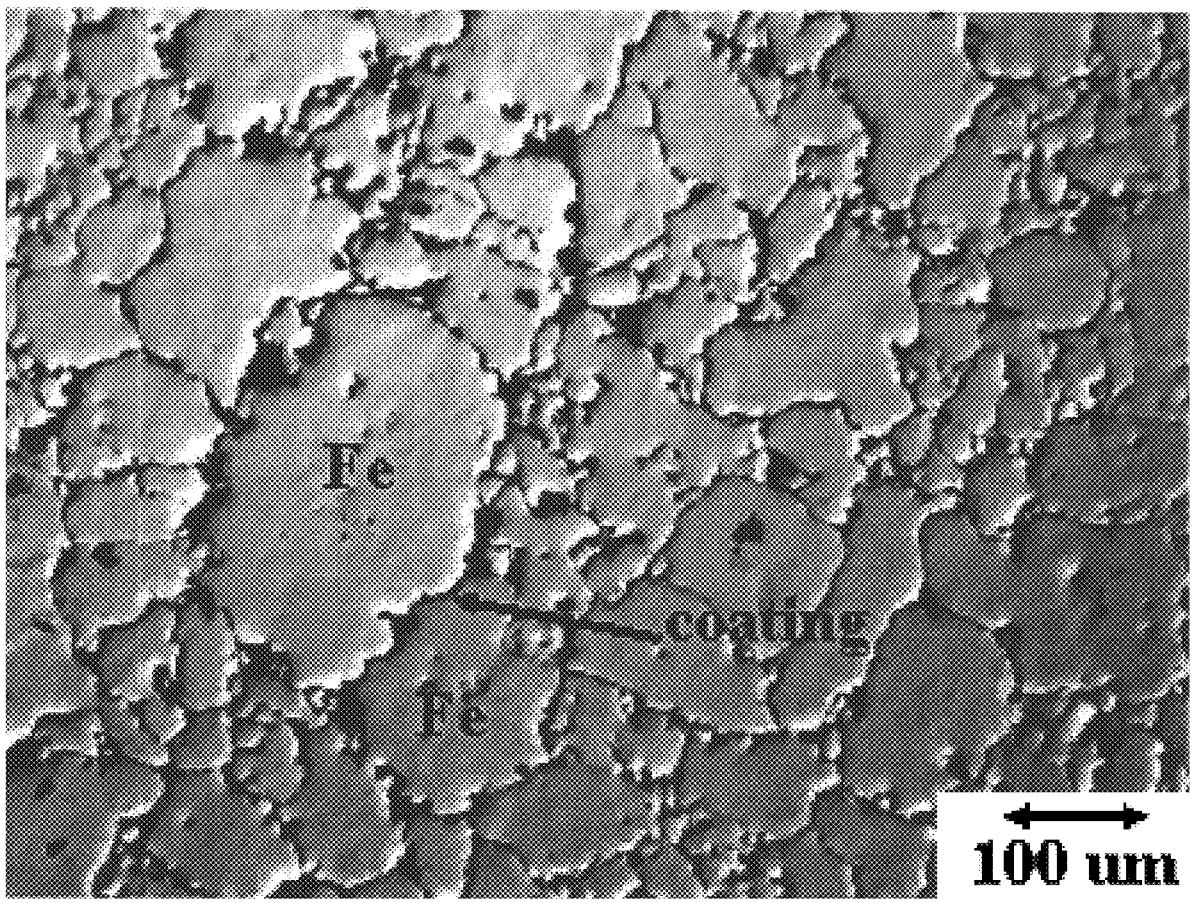
FIG. 5 is an optical micrograph of a cross section of a part made according to the present invention shown at 1000× magnification.

The rectangular cross section is polished metallographically and an optical micrograph is taken and shown in FIG. 5 wherein powder size distribution is shown. No porosity is apparent in the cross section and a continuous coating is shown surrounding each individual particle. The coating thickness appears to be less than 1 micron.

Figure 6A:
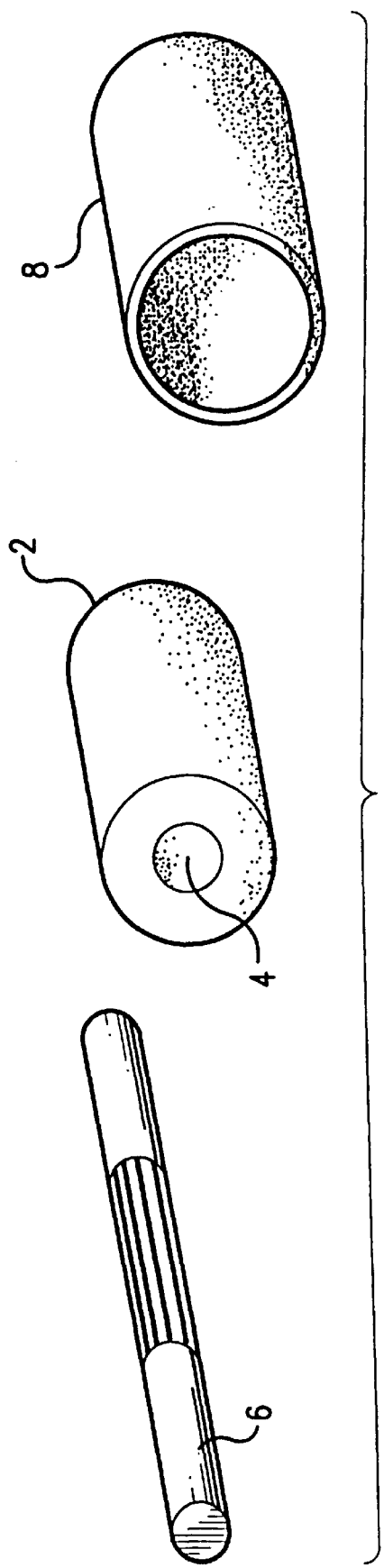
FIG. 6 is an exploded view of a rotor according to the present invention.
Figure 6B:
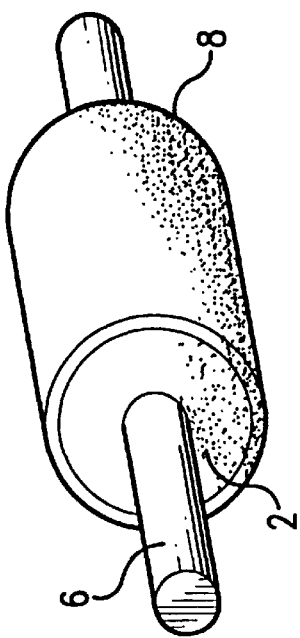

A rotor in accordance with the present invention is shown in FIG. 6 wherein a plurality of ferromagnetic particles according to the present invention are consolidated in the shape of annular shaped cylinder 2 defining cylindrical void 4. through which passes elongated cylindrical shaft 6 for rotating the rotor. Hollow cylinder casing 8 encases elongated annular shaped cylinder 2 and is typically comprised of compressed permanent magnetic particles which can be pure iron or coated particles.

The invention further includes an armature assembly for an alternating current generator comprised of a plurality of ferromagnetic particles consolidated in the shape of an armature core and a shaft for rotating the armature thereon. The shape comprises elongated annular shaped cylinder 2 defining elongated cylindrical void 4 through which passes shaft 6. Annular shaped cylinder 2 has a plurality of troughs 8 at spaced intervals extending lengthwise along exterior surface 9 thereof.

Of course the shapes of the aforementioned parts are exemplary only and should be construed to include the shape of all and any magnetic parts made from compressed particles according to the present invention.

Since certain changes may be made in the ferromagnetic powder, coating, soft (and hard) magnetic parts, and methods of making the same, described above without departing from the spirit and scope of the present invention, it is intended that all matter contained in the above description or shown in the accompanying drawings be interpreted in an illustrative and not in a limiting sense.

What is claimed is:

1. A soft magnetic part comprising a three-dimensional structure comprised of:
consolidated ferromagnetic particles each coated with a conversion coating material comprising from about 2 to about 4 parts by weight of an iron oxide to one part of a member selected from the group consisting of iron chromate, iron molybdate, iron oxalate, iron phosphate, iron tungstate and combinations thereof, wherein said coating is substantially free of organic materials, said part having a density greater than about 7.4 g/cc.

2. A part according to claim 1, wherein said coating comprises from about two to about four parts of an oxide and about one part of a phosphate.

* * * * *